(No Model.)

G. BRUEMMER.
BEAN CUTTER.

No. 411,235. Patented Sept. 17, 1889.

WITNESSES:
A. P. Grant,
L. Douville

INVENTOR:
Gerhard Bruemmer,
BY John A. Wiedersheim
ATTORNEY.

UNITED STATES PATENT OFFICE.

GERHARD BRUEMMER, OF PHILADELPHIA, PENNSYLVANIA.

BEAN-CUTTER.

SPECIFICATION forming part of Letters Patent No. 411,235, dated September 17, 1889.

Application filed August 19, 1886. Serial No. 211,255. (No model.)

*To all whom it may concern:*

Be it known that I, GERHARD BRUEMMER, a subject of the Emperor of Germany, residing in the city and county of Philadelphia, State of Pennsylvania, have invented a new and useful Improvement in Bean-Cutters, which improvement is fully set forth in the following specification and accompanying drawings, in which—

Figure 1:
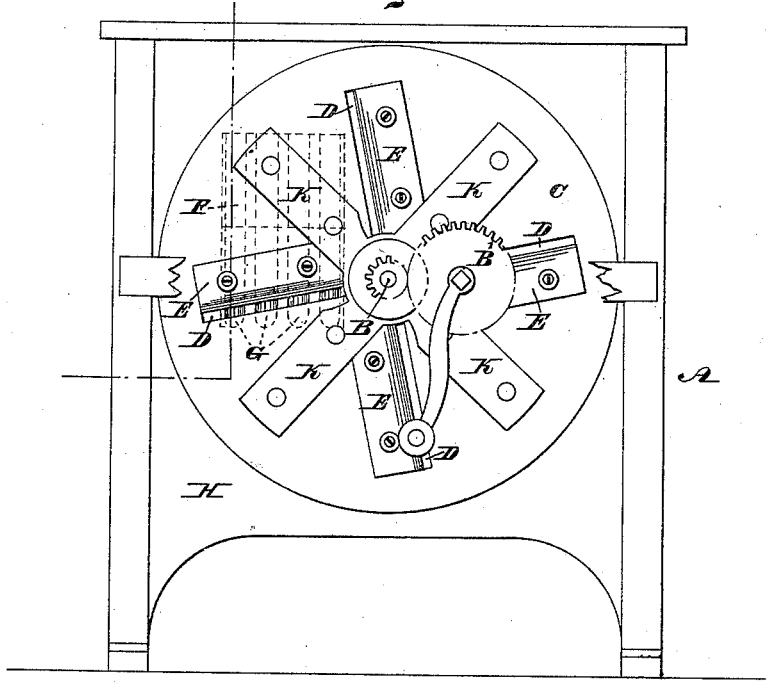
Figure 2:
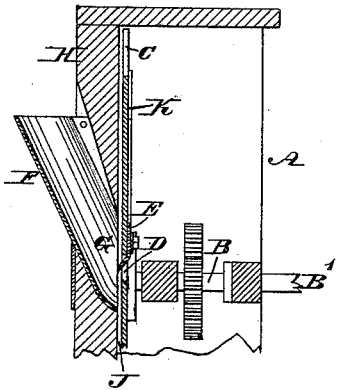
Figure 3:
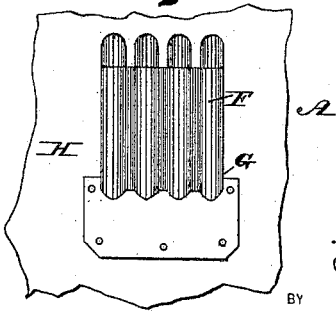

Figure 1 represents a side elevation of a bean-cutter embodying my invention. Fig. 2 represents a vertical section of a portion thereof. Fig. 3 represents a side elevation of a portion opposite to that shown in Fig. 1.

Similar letters of reference indicate corresponding parts in the several figures.

My invention consists of a bean-cutter having blades for forming a draw cut, a gage for uniformly cutting the beans, and means for strengthening the cutter-head, as will be hereinafter set forth.

Referring to the drawings, A represents a stand or frame on which is mounted a horizontal shaft B, the latter carrying a pinion with which is geared a spur-wheel, the shaft B′ whereof is provided with a crank-handle, so that it may be conveniently operated and rapidly rotated. Secured to the shaft B is a cutter-head C, which is formed of a disk or plate with slots D at intervals, said slots forming throats for the escape of the cut beans. Attached to the walls of the slots D are blades E, whose cutting-edges are bent laterally in the direction toward the feed-chutes F of the device, said chutes extending upright and being formed of metal or other material bent into semi-tubular shape, open at the top and bottom, the bottom openings being in communication with throats G, formed in the side or wall H of the frame A, said chutes extending in inclined direction and being secured to said side H, the throats directing the beans to the cutter-head.

The blades E are secured to the head C so that their cutting-edges are tangential, and when the head is rotated said edges pass the throats G and cut or slice the beans with a draw cut, so that the operation of cutting the beans is performed in an easy manner.

The head C is set back from the side H of the frame A, leaving a space J between said parts, the same forming a gage for the beans to be sliced or cut.

The beans are placed in the chutes F and the cutter rotated. The beans by gravity fall through the throats G and abut against the cutter-head as a stop. The adjacent blades E then cut into the beans and sever therefrom lengths equal or about equal to the space J. The beans then drop against the cutter-head and are again sliced or cut, and thus the work continues, the sliced or cut beans passing through the slots D, and as they drop therefrom they may be directed into a suitable box or vessel and thereby collected.

The cutter-head is made of a thin disk of metal or material, so as to be light, inexpensive, and occupy but small space. In order to stiffen and strengthen the same, I rivet or othwise attach to the back of the same arms K, which re-enforce the disk, especially between the slots D, which otherwise weaken the disk, said slots and arms alternating, as shown in Fig. 1.

In order to render the feed-chutes F light, strong, and inexpensive, they are made of a piece of metal crimped or corrugated, as shown in Fig. 3.

In the side of the frame A, where the chute F is located, are vertical grooves F′, occupying position coincident with the corrugations of said chute F, so that said grooves and corrugations form passages for the reception of the beans which are to be sliced. By this construction the side of the frame is utilized to form part of the chute proper, thus avoiding the making of the corrugations of the chute F deep and large, and thereby effecting a saving of metal.

The cutter-head is made of a disk of thin metal for the purpose of lightness, the same being slotted and having the blades E secured in position, as has been stated. The arms K are made of one piece of metal, and thus stiffen the thin cutter-head without adding much weight thereto.

I am aware that it is not new to provide vegetable-cutters with corrugated chutes. Neither is it new to provide the cutter-heads of the same with strenghtening-pieces, and such I do not claim; but I am not aware that a device of this character has been constructed as herein described, all of the several parts aiding in the production of a device which is simple in construction, easy of operation, and inexpensive in cost.

Having thus described my invention, what I claim as new, and desire to secure by Letters Patent, is—

A bean-cutter having a disk of sheet metal provided with slots, blades secured to the walls of the slots and having their edges bent laterally in the direction of the feed-chutes, and a series of arms integral with each other and alternating with the slots, and a casing with vertical grooves, and a feed-chute with corrugations coinciding with said grooves, said parts being combined substantially as described.

GERHARD BRUEMMER.

Witnesses:
JOHN A. WIEDERSHIEM,
A. P. GRANT.